United States Patent [19]

Taniguchi et al.

[11] Patent Number: 5,242,872
[45] Date of Patent: Sep. 7, 1993

[54] PROCESS FOR PRODUCING ALUMINUM NITRIDE SINTERED BODY

[75] Inventors: Hitofumi Taniguchi, Chigasaki; Nobuyuki Kuramoto, Sagamihara, both of Japan

[73] Assignee: Tokuyama Soda Kabushiki Kaisha, Tokuyama, Japan

[21] Appl. No.: 724,520

[22] Filed: Jun. 28, 1991

Related U.S. Application Data

[60] Continuation of Ser. No. 461,900, Jan. 8, 1990, abandoned, which is a division of Ser. No. 71,252, Jul. 8, 1987, Pat. No. 4,950,435.

[30] Foreign Application Priority Data

Jul. 18, 1986 [JP] Japan .................................. 61-168016
Jul. 8, 1987 [JP] Japan .................................. 62-071252

[51] Int. Cl.$^5$ ............................................. C04B 35/58
[52] U.S. Cl. ....................................... 501/98; 501/96; 264/65
[58] Field of Search ........................ 264/65; 501/96, 98

[56] References Cited

U.S. PATENT DOCUMENTS

| | | | |
|---|---|---|---|
| 4,327,187 | 4/1982 | Komatsu et al. | 501/97 |
| 4,435,513 | 3/1984 | Komeya et al. | 501/96 |
| 4,642,298 | 2/1987 | Kuramoto et al. | 501/96 |
| 4,746,637 | 5/1988 | Kasori et al. | 501/98 |
| 5,077,245 | 12/1991 | Miyahara | 501/98 |

FOREIGN PATENT DOCUMENTS

| | | |
|---|---|---|
| 0015421 | 9/1980 | European Pat. Off. |
| 0071997 | 6/1982 | European Pat. Off. |
| 58-55377 | 4/1983 | Japan . |
| 60-141607 | 7/1985 | Japan . |
| 61-122168 | 6/1986 | Japan . |
| 2063302 | 6/1981 | United Kingdom . |
| 2140458 | 11/1984 | United Kingdom . |

*Primary Examiner*—James Derrington
*Attorney, Agent, or Firm*—Wenderoth, Lind & Ponack

[57] ABSTRACT

A process for producing a sintered body of aluminum nitride, which comprises mixing an aluminum nitride powder with (A) an alkaline earth metal aluminate, or both of (A-1) an oxide or oxide-forming compound of aluminum, and (A-2) an oxide or oxide-forming compound of an alkaline earth metal, and (B) an oxide or oxide-forming compound of yttrium or an element of the lanthanide series, and firing the resulting mixture.

3 Claims, No Drawings

PROCESS FOR PRODUCING ALUMINUM NITRIDE SINTERED BODY

This application is a continuation of now abandoned application Ser. No. 07/461,900 filed on Jan. 8, 1990 abandoned which is a division of application Ser. No. 07/071,252 filed Jul. 8, 1987, now U.S. Pat. No. 4,950,435.

This invention relates to a process for producing an aluminum nitride sintered body. More specifically, it relates to a process for producing an aluminum nitride sintered body having high purity, high density and particularly superior thermal conductivity.

Aluminum nitride sintered bodies have recently attracted particular attention as insulators having high thermal conductivity as well as excellent heat resistance, corrosion resistance and strength. Usually, a sintered body of aluminum nitride is obtained by firing a powdery mixture composed of aluminum nitride and a sintering aid under atmospheric pressure or while applying a mechanical pressure. The resulting sintered body contains several percent of impurities ascribable to the sintering aid.

Japanese Laid-Open Patent Publication No. 55377/1983 describes a process for producing an aluminum nitride sintered body, which comprises preparing a powdery mixture composed of (a) an aluminum nitride powder, (b) a powder of at least one compound selected from calcium oxide, barium oxide and strontium oxide and compounds convertible to these oxides by firing, and (c) a carbon powder or a powder of a substance convertible to carbon by firing, molding the powdery mixture, and then sintering the molded mixture. Since impurities derived from the sintering aids used in this process such as calcium oxide diffuse to the crystal grains of the resulting aluminum nitride sintered body to form a solid solution with the aluminum nitride, it is difficult to obtain an aluminum nitride sintered body having the inherent excellent properties, such as high thermal conductivity, of the aluminum nitride.

The present applicant previously proposed the following processes involving the use of halogen-containing compounds as part of a sintering aid for the production of an aluminum nitride sintered body having high thermal conductivity.

U.S. patent application Ser. No. 894,256 discloses a process in which an alkali metal aluminate and a halide of yttrium, an element of the lanthanide series or an alkaline earth metal are used in combination as a sintering aid for aluminum nitride.

Japanese Laid-Open Patent Publication No. 108774/1987 discloses a process in which a combination of an alkaline earth metal oxide or a compound convertible to the oxide by firing and an alkaline earth metal halide is used as a sintering aid for aluminum nitride.

Japanese Laid-Open Patent Publication No. 41766/1987 discloses a process in which an oxide of yttrium or a lanthanum-group metal or a compound convertible to the oxide by firing and an alkaline earth metal halide is used as a sintering aid for aluminum nitride.

Japanese Laid-Open Patent Publication No. 105,960/1988 discloses a process in which an oxide of yttrium or a lanthanum-group metal or a compound convertible to the oxide by firing and a halide of yttrium or a lanthanum-group metal is used as a sintering aid for aluminum nitride.

In any of the aforesaid processes in which a halogen compound is used as part of the sintering, part or substantially all of the sintering aid disappears from aluminum nitride at the time of firing, and a sintered body having very high thermal conductivity can be obtained. It cannot be denied however that the halogen compound volatilized during firing exerts a deleterious effect on the furnace material.

"Summaries of Papers Published in Meeting for Basic Discussions of Ceramics" (published on Jan. 22–24, 1986, 1D13) gives an article entitled "Thermal Conductivity and Microstructure of AlN ceramics containing $Y_2O_3$", and states that a sintered body obtained by adding 0 to 10% by weight of $Y_2O_3$ to Aln powder containing 0.97% by weight of oxygen and sintering the mixture under atmospheric pressure was determined by X-ray analysis to have a composition close to $Y_3Al_5O_{12}$ (amount of $Y_2O_3$ added: 1, 3 wt. %), $YAlO_3$ (amount of $Y_2O_3$ added: 3, 5 wt. %), $Al_2Y_4O_9$ (amount of $Y_2O_3$ added: 5, 7, 10 wt. %), $Y_2O_3$ (amount of $Y_2O_3$ added: 10 wt. %), in its triple grain boundaries.

Japanese Laid-Open Patent Publication No. 122,168/1986 discloses a process for producing a sintered body which comprises mixing an aluminum nitride powder containing not more than 3.0% by oxygen with an aluminate (sintering aid) represented by the following formula

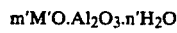

wherein M' is Ca, Ba or Sr, m' is a number of at least 1, and n' is a number of 0 or more, and sintering the mixture.

GB 2140458 A specification describes a process for producing a tubular component of densely sintered aluminum nitride, which comprises forming a green molding from a pulverulent mixture of aluminium nitride and 0.1 to 10% by weight of an oxide additive, and sintering the molding in an inert atmosphere. The specification discloses one or more of the oxides of the alkaline earth metals, of the rare earth metals (scandium, yttrium and lanthanum up to lutetium), of the transition elements of the IVth, Vth and VIth groups of the periodic system, aluminium oxide and silicon oxide.

It is an object of this invention to provide a process for producing a sintered body of aluminum nitride having excellent properties, especially high thermal conductivity.

Another object of this invention is to provide a novel process for producing the above aluminium nitride sintered body using a novel sintering aid.

Still another object of this invention is to provide a novel process of producing an aluminum nitride sintered body in which the volatilization of a sintering aid does not lead to significant consumption of a sintering furnace.

Further objects of this invention along with its advantages will become apparent from the following description.

According to this invention, the above objects and advantages are achieved by a process for producing a sintered body of aluminum nitride, which comprises mixing an aluminum nitride powder with (A) an alkaline earth metal aluminate and (B) an oxide or oxide-forming compound of yttrium or an element of the lanthanide series, and firing the resulting mixture.

The aluminum nitride powder used in the process of the invention may be any known one, and there is no need to use a particularly limited aluminum nitride powder.

When it is desired to produce a sintered body having a particularly high thermal conductivity of, for example, at least 220 W/m-K, the aluminum nitride powder preferably has an average particle diameter of not more than 3 micrometers and contains at least 80% by volume of particles having a paricle diameter of not more than 5 micrometers. More preferably, the aluminum nitride powder used has an oxygen content of not more than 3% by weight, particularly not more than 1.5% by weight, and contains not more than 0.5% by weight of metal elements other than aluminum as impurities. Thus, it is preferred to use aluminum niride powder having a purity of at least 96% by weight, especially at least 98% by weight.

The average particle diameter, as used in the present specification, is not the average particle diameter of primary particles as can be calculated from a scanning electronmicrograph of the powder, but denotes the average of the particle diameters of secondary agglomerated particles which can be actually measured by a sedimentation-type particle size distribution analyzer.

One characteristic feature of the present invention is that as a result of using a sintering aid composed of two particular components in the sintering of aluminum nitride powder, the sintering aid itself or some compound formed between the sintering aid and the impurities contained in aluminum nitride becomes easy to flow and can be easily expelled by sublimation or otherwise. Therefore, the amount of the sintering aid in the sintered body is very small, and the amount of oxygen in it can also be made very small. Because of the small amounts of the sintering aid and oxygen, the resulting aluminum nitride sintered body have excellent properties, particularly high thermal conductivity.

The sintering aid used in this invention is a combination of (A) an alkaline earth metal aluminate and (B) an oxide or oxide-forming compound of yttrium or an element of the lanthanide series.

The alkaline earth metal aluminate as component (A) can usually be represented by the following general formula

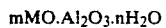

$$mMO \cdot Al_2O_3 \cdot nH_2O$$

wherein M is an alkaline earth metal, m is a number of at least 0.3, and n is 0 or a positive number.

In the above formula, beryllium, magnesium, calcium, strontium and barium can, for example, be used as the alkaline earth metal. Calcium, strontium and barium are particularly preferred because they lead to very high thermal conductivity. As m is larger, the effect of the sintering aid becomes greater and the purity of the resulting aluminum nitride sintered body becomes higher. Accordingly, the aluminate used in this invention is preferably one in which m is at least 1, particularly at least 2. The aluminate may be anhydrous or contain water of crystallization.

Examples of aluminates suitably used in this invention include calcium aluminates or hydrates thereof such as $CaO \cdot 2Al_2O_3$, $CaO \cdot Al_2O_3$, $5CaO \cdot 3Al_2O_3$, $12CaO \cdot 7Al_2O_3$ and $3CaO \cdot Al_2O_3$; barium aluminate or its hydrate such as $3BaO \cdot Al_2O_3$; and strontium aluminates and its hydrate such as $3SrO \cdot A_2O_3$ and $3SrO \cdot Al_2O_3 \cdot 6H_2O$. Mixtures of two or more of these aluminates may of course be used.

As the particle diameter of the aluminate is smaller, it exhibits a greater effect as a sintering aid. Preferably, the aluminate has an average particle diameter of not more than 10 micrometers, particularly not more than 5 micrometers. It is generally preferred to use an aluminate having an average particle diameter of 0.1 to 10 micrometers, especially 0.1 to 5 micrometers.

Component (B) of the sintering aid is at least one compound selected from an oxide or oxide-forming compound of yttrium or an element of the lanthanide series.

In the present specification and claims, the term "oxide-forming compound" dentoes a compound which is not an oxide but is converted to the oxide by heating to the firing temperature.

Examples of the element of the lanthanide series are lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). Of these, Y, La, Ce, Pr, Nd, Sm, Eu, Cd and Dy are preferred industrially. Compounds of these capable of forming oxides may, for example, include, carbonates, oxalates, nitrates, nitrites, bicarbonates, sulfates, sulfites, chlolates and acetates of yttrium and these elements of the lanthanide series. Industrially, the carbonates, nitrates and oxalates are preferably used.

Specific examples of the component (B) used in this invention are yttrium oxide, lanthanum oxide, cerium oxide, praseodymium oxide, neodymium oxide, samarium oxide, europium oxide, gadolinium oxide, dysprosium oxide, yttrium carbonate, lanthanum carbonate, cerium carbonate, praseodymium carbonate, neodymium carbonate, samarium carbonate, europium carbonate, gadolinium carbonate, dysprosium carbonate, yttrium nitrate, lanthanum nitrate, cerium nitrate, praseodymium nitrate, neodymium nitrate, samarium nitrate, europium nitrate, gadolinium nitrate, dysprosium nitrate, yttrium oxalate, lanthanum oxalate, cerium oxalate, praseodymium oxalate, neodymium oxalate, samarium oxalate, europium oxalate, gadolinium oxalate and dysprosium oxide. The use of the oxides is preferred because it can give aluminum nitride sintered bodies having higher thermal conductivity.

As the component (B) has a smaller particle diameter, it exhibits a greater effect as a sintering aid. Preferably, the component (B) has an average particle diameter of not more than 10 micrometers, especially not more than 5 micrometers, above all not more than 2 micrometers.

The amounts of the components (A) and (B) of the sintering aid used in this invention vary depending upon the properties required of the sintered body and cannot be generalized. Generally, the proportion of the component (A) is preferably 0.02 to 10% by weight, more preferably 0.3 to 3% by weight, based on the total weight of the aluminum nitride powder and the components (A) and (B) of the sintering aid. The proportion of the component (B) is preferably 0.02 to 5% by weight, more preferably 0.2 to 2% by weight, on the same basis.

Within the above-specified ranges of the amounts of the components (A) and (B), the weight ratio of the component (A) to the component (B) is preferably from 0.2 to 15, more preferably from 0.33 to 10. By these quantitative limitations, the amount of the sintering aid remaining after the sintering and the amount of oxygen in the sintered body can further be decreased.

There is no limitation on the method of mixing the aluminum nitride powder and the components (A) and (B) as the sintering aid, and both dry mixing and wet mixing may be employed. The wet mixing in the presence of a liquid dispersing medium is particularly preferred. There is no particular limitation on the liquid dispersing medium. Generally, water, alcohols, hydrocarbons and mixtures of these are preferably used. In industrial application, lower alcohols having not more than 4 carbon atoms such as methanol, ethanol and butanol are most preferably used. The mixing may be carried out by using an ordinary powder mixing machine, for example, a tumbler-mixer, a ball mill-type mixer, and a kneader-type Generally, mixing means involving pulverization or milling are preferred.

Preferably, the mixing machines may be constructed of a material which does not generate substances that will become impurities in the sintered body. Preferred materials are aluminum nitride itself, plastics such as polyethylene, polyurethane and polyamides, and materials coated with these materials.

The sequence of mixing the aluminum nitride powder, and the components (A) and (B) of the sintering aid is neither limited in particular. For example, the three components may be mixed at a time; or any two components are first mixed and the mixture is further mixed with the remaining one component. Preferably, components (A) and (B) of the sintering aid are first mixed, and the mixture is then mixed with the aluminum nitride powder in order to disperse the components (A) and (B) uniformly in the aluminum nitride powder as a main component.

The mixed powder of the aluminum nitride powder and the sintering aid, either as such or optionally after adding a plasticizer, a binder, etc., is shaped into the desired shape by suitable method, for example by using a dry press method, a rubber press method, an extrusion method, an injection method or a doctor blade sheet forming method, as required dried, and then fired.

As the plasticizer or the binder, there may, for example, be used water, alcohols, hydrocarbons, polyvinyl alcohol, polyvinyl butyral, polyvinyl acetate, saponified polyvinyl acetate, gelatin, agar, oils, wax and natural or synthetic polymeric substances.

The green aluminum nitride of a suitable shape is put in a container, such as a crucible, a sheath or a dish made of graphite, aluminum nitride, etc. and dewaxed and fired at a high temperature under atmospheric pressure to about 100 atmospheres in vacuum or in a non-oxidizing atmosphere such as nitrogen gas, helium gas or argon gas. Alternatively, the above mixture may be fired at a high temperature under a gas pressure of atmospheric pressure to about 100 atmospheres in vacuum or in a non-oxidizing atmosphere while applying a mechanical pressure of about 20 to 500 kg/cm$^2$. The suitable firing temperature is 1600° to 2400° C., preferably 1650° to 1900° C., in vacuum or in a non-oxidizing atmosphere under atmospheric pressure. In particular, under a nitrogen gaseous pressure, the firing temperature is preferably 1600° to 2400° C., more preferably 1650° to 2300° C. The firing temperature, as referred to above, is obtained by measuring the temperature of the surface of the container (e.g., graphite crucible) containing the green molding by means of a radiation thermometer, and compensating it so that it shows the temperature of the gas within the container.

In order to give an aluminum nitride sintered body which has a higher thermal conductivity and is more densified, it is preferred to raise the temperature at an average temperature elevating rate of 1° to 40° C./min., more preferably 5° to 30° C./min., at least within the temperature range of from 1100° C. to 1600° C., and then to perform firing at 1600° to 2400° C.

It is important to determine the rate of temperature elevation by selecting such temperature elevating conditions that no excessive evaporation of the sintering aid occurs during temperature elevation and after sintering, the amount of the sintering aid components remaining in the sintered body is minimized. Accordingly, the optimum average temperature elevation rate should be selected within the aforesaid preferred range depending upon the types and amounts of the components (A) and (B) of the sintering aid to be added. Industrially, it is preferred to set a single temperature elevating rate within the range of 1100° to 1600° C. It is also possible to employ a temperature elevating program having two or three stages of rate gradients.

There is no particular restriction on the rate of temperature elevation to 1100° C. nor on the rate of temperature elevation to the firing temperature from 1600° C.

After temperature elevation in the above manner, the firing is carried out at a temperature of preferably 1600° to 2400° C. The firing time varies depending upon the firing temperature, the types and amounts of the sintering aid components, and the average temperature elevation rate. Usually, it is 10 minutes to 30 hours.

The process of this invention can give a sintered body of aluminum nitride containing very small amounts of the remaining sintering aid components and having very superior thermal conductivity. The properties of the aluminum nitride sintered body obtained by the process of this invention will be described in greater details hereinafter.

Investigations of the present inventors have shown that when the following components (A-1) and (A-2) capable of forming alkaline earth metal aluminates during firing are used instead of the alkaline earth metal aluminate as component (A), a sintered body containing little sintering aid components and having excellent thermal conductivity can be produced as in the process described above.

Thus, according to this invention, there is also provided a process for producing a sintered body of aluminum nitride, which comprises mixing an aluminum nitride powder with (A-1) an oxide-forming compound of aluminum, (A-2) an oxide or oxide-forming compound of an alkaline earth metal, and (B) an oxide or oxide-forming compound of yttrium or an element of the lanthanide series, and firing the resulting mixture.

It should be understood that the "oxide-forming compound" has the same meaning as the "oxide-forming compound" described hereinabove with regard to component (B).

The oxide or oxide-forming compound of aluminum preferably includes, for example, aluminum oxide, aluminum hydroxide, aluminum nitrate and aluminum acetate. They may be used singly or in combination.

In this regard, it appears that $Al_2O_3$ contained as an impurity in the starting aluminum nitride does not function as the component (A-1), although no clear reason can be assigned to it.

Preferred examples of the oxide or oxide-forming compound of the alkaline earth metal as component (A-2) include oxides, carbonates, oxalates, nitrates, nitrites, bicarbonates, sulfates, sulfites, chlorates and acetates. They may be used either singly or in combination.

Calcium, strontium and barium, for example, are preferred as the alkaline earth metal.

In the process of this invention involving the use of the components (A-1) and (A-2), it is desirable to use these components in such proportions that the amount of component (A-2) is at least 0.1 mole, preferably 0.3 to 12 moles, per mole of the component (A-1).

It should be understood that otherwise, the foregoing description of the process of this invention using the component (A) applies to the process of this invention using a combination of the components (A-1) and (A-2) if components (A-1) and (A-2) are read for component (A).

Even when the sintering aid is added in a required amount for sintering the aluminum nitride powder, for example, in an amount of several percent by weight, the amount of the sintering aid contained in the sintered body of aluminum nitride obtained is less than ½, in many cases less than 1/5, and even less than 1/10, of the amount of the sintering aid added to the starting mixture.

In other words, the amount of the sintering aid remaining in the sintered body of aluminum nitride is not more than 0.5% by weight, usually not more than 0.3% by weight, and at times, not more than 0.1% by weight, as metals of the components (A) and (B).

It is known that the components (A) and (B) of the sintering aid singly have a function and effect as a sintering aid. However, as stated hereinabove, such sintering aids when used singly remain as impurities in the inside of the aluminum nitride sintered body obtained, and cause a degradation in its properties. However, the present invention brings about the surprising advantage that the amount of the components (A) and (B) remaining in the sintered body of aluminum nitride is much smaller than that before firing.

According to the process of this invention, the oxygen content of the sintered body is much reduced. The amount of oxygen attributed to aluminum nitride and the sintering aid is less than ½, or even less than 1/5, and is thus less than 0.5% by weight, and even less than 0.2% by weight.

The sintered body of aluminum nitride obtained by the process of this invention has very high thermal conductivity since it contains small amounts of both sintering aids and oxygen. Usually, it has a thermal conductivity of at least 150 W/m-k, preferably at least 200 W/m-k. Furthermore, depending upon the firing conditions, a sintered body having a very high thermal conductivity of at least 220 W/m-k, for example as high as 260 W/m-k can be obtained. The process of this invention can also give a sintered body aluminum nitride having excellent light perviousness. Specifically, a sintered body of aluminum nitride having a coefficient of absorption of not more than 60 cm$^{-1}$ to light having a wavelength of 5.5 micrometers in the Lambert-Beer equation can be obtained.

The sintered aluminum body obtained by the process of this invention is a dense sintered body having a sintering density of at least 3.2 g/cm$^3$.

The process of the invention for producing a sintered body of aluminum nitride having the aforesaid excellent properties is industrially very important and highly valuable as a process for producing a new material.

REFERENTIAL EXAMPLE 1

Six hundred grams of calcium carbonate having an average particle diameter of 2.1 micrometers and 200 g of alumina having an average particle diameter of 0.6 micrometer were ball-milled in the dry state for 18 hours in an alumina pot with alumina balls. The mixture was fired at 1350° C. for 5 hours. The reaction product was pulverized by the aforesaid alumina pots with balls. The firing and pulverization were each repeated three times, and the reaction was completed. The final reaction product was pulverized by a jet mill lined with alumina to form a powder having an average particle diameter of 1.4 micrometers. The powder obtained was determined to be $3CaO.Al_2O_3$ by X-ray analysis.

EXAMPLE 1 AND COMPARATIVE EXAMPLE 1

To aluminum nitride powder (with the composition shown in Table 1 below) having an average particle diameter of 1.42 micrometers and containing 87% by weight of particles with a particle diameter of not more than 3 micrometers were added 2% by weight of $3CaO.Al_2O_3$ prepared in Referential Example 1 and 1% by weight of yttrium oxide having an average particle diameter of 1.5 micrometers. They were uniformly mixed in ethanol. The mixture was dried. About 1.0 g of the mixture was placed in a mold having an inside diameter of 15 mm and pressed by a uniaxial press under a pressure of 200 kg/cm$^2$ and then by a rubber press under a pressure of 1500 kg/cm$^2$ to form a powdery molding having a density of 1.60 g/cm$^3$. The molding was put in a graphite crucible coated with boron nitride powder, and heated in nitrogen under 1 atmosphere to 1100° C. over 40 minutes and then from 1100° C. to 1800° C. at a rate of 15° C./min., and maintained at 1800° C. for 13 hours. The resulting sintered body had a density of 3.26 g/cm$^3$.

The sintered body was cut to a thickness of 6 mm, and its thermal conductivity was measured by a laser flash method in accordance with a non-contact method using an In-Sb infrared sensor. It was found to be 263 W/m-k.

By a radioactivation analysis method, the sintered body was determined to have an oxygen content of 0.06% by weight.

The sintered body was subjected to alkali fusion, and the contents of Ca, Y, Mg, Cr, Si, Zn, Fe, Cu, Mn, Ni, Ti and Co in the fused product were measured by an inductively coupled plasma emission spectral analysis method. As concentrations in this sintered body, Ca=45 ppm, Y=310 ppm, Mg<5 ppm, Cr<10 ppm, Si=73 ppm, Zn<10 ppm, Fe<10 ppm, Cu<10 ppm, Mn<5 ppm, Ni<10 ppm, Ti<10 ppm, and Co<10 ppm. The total content of ten metal elements excepting Ca and Y added as sintering aids was less than 153 ppm.

Another sintered body obtained in the same way as above was cut to a thickness of 0.5 mm, and both surfaces were polished to form mirror surfaces. The light transmittance of the sintered product measured was 38% (linear transmittance) to light having a wavelength of 5.5 micrometers.

For comparison, a sintered body was produced in the same way as above except that 2% by weight of $3CaO.Al_2O_3$ was added to the powder shown in Table 1. The resulting sintered body had a density of 3.25 g/cm$^2$ cm and contained 0.25% by weight of oxygen, 88 ppm of calcium as impurities. The sintered body was cut to a thickness of 6 mm, and the thermal conductivity of the resulting sample, measured as above, was 143 W/m-k. The sintered body had a transmittance of 30%.

A sintered body obtained as above except that 2% by weight of yttrium oxide was added as a sintering aid contained 0.66% by weight of oxygen and 6900 ppm of yttrium and had a light transmittance of 34%, a density of 3.24 g/cm³ and a thermal conductivity of 152 W/m-k.

The above procedure was repeated except that 2% by weight of calcium oxide having an average particle diameter of 1.6 micrometers and 1% by weight of yttrium oxide having an average particle diameter of 1.5 micrometers were added as the sintering aid. The resulting sintered body had a density of 3.25 g/cm³, a light transmittance of 21% and a thermal conductivity of 158 W/m-k, and contained 0.75% of oxygen, 2950 ppm of calcium, 7870 ppm of yttrium and 220 ppm of other metallic impurities.

TABLE 1

| Analysis values of aluminum nitride powder AlN content: 98.3% ||
|---|---|
| Element | Content (ppm) |
| Mg | <5 |
| Cr | <10 |
| Si | 75 |
| Zn | <10 |
| Fe | 15 |
| Cu | <5 |
| Mn | <5 |
| Ni | <10 |
| Ti | <5 |
| Co | <5 |
| Al | 64.8 (wt. %) |
| N | 33.5 (wt. %) |
| O | 1.0 (wt. %) |
| C | 0.04 (wt. %) |

REFERENTIAL EXAMPLE 2

Six hundred grams of barium carbonate having an average particle diameter of 1.8 micrometers and 100 g of alumina having an average particle diameter of 0.6 micrometer were mixed in the dry state for 18 hours in an alumina pot with alumina balls. The mixture was fired at 1550° C. for 5 hours. The reaction product was pulverized in an alumina pot with alumina balls. The firing and pulverization were each repeated three times, and the reaction was completed. The reaction product was pulverized in a jet mill lined with alumina to obtain a powder having an average particle diameter of 1.6 micrometers. The powder was found to have a single phase composition of $3BaO.Al_2O_3$ by X-ray analysis.

REFERENTIAL EXAMPLE 3

Strontium carbonate having an average particle diameter of 3.2 micrometers (550 g) and 100 g of alumina having an average particle diameter of 0.6 micrometer were mixed in the dry state for 18 hours in an alumina pot with alumina balls. The mixture was fired at 1600° C. for 4 hours. The reaction product was pulverized in an alumina pot with alumina balls. The firing and pulverization were each repeated three times, and the reaction was completed. The reaction product was pulverized in a jet mill lined with alumina to obtain a powder having an average particle diameter of 1.4 micrometers. The powder was found to have lysis.

EXAMPLE 2

In each run, the same AlN powder as used in Example 1 was mixed with 2% by weight of each of the calcium aluminates prepared by the method of Referential Example 1 and barium aluminate and strontium aluminate prepared by the methods of Referential Examples 2 and 3 as component (A) of a sintering aid and 1% by weight of $Y_2O_3$ having an average particle diameter of 1.2 micrometers as component (B) of the sintering aid. The mixture was fired by the same procedure as in Example 1 to obtain a pressureless sintered body. The thermal conductivity of the sintered body was measured by the same method as in Example 1. The firing conditions and the results are shown in Table 2.

TABLE 2

| | Firing conditions ||| Sintering aid ||
|---|---|---|---|---|---|
| | | | Temperature elevating rate (°C./min.) | Component (A) || Component (B) $Y_2O_3$ Amount (wt. %) |
| Run | Temperature (°C.) | Time (hours) | | Chemical formula (average particle diameter) | Amount (wt. %) | |
| 1 | 1800 | 10 | 10 | $5CaO.3Al_2O_3$ (1.8 μm) | 2 | 1 |
| 2 | 1800 | 10 | 10 | $12CaO.7Al_2O_3$ (1.5 μm) | 2 | 1 |
| 3 | 1800 | 10 | 10 | $CaO.Al_2O_3$ (1.5 μm) | 2 | 1 |
| 4 | 1800 | 10 | 10 | $CaO.2Al_2O_3$ (1.1 μm) | 2 | 1 |
| 5 | 1800 | 10 | 10 | $3BaO.Al_2O_3$ (1.6 μm) | 2 | 1 |
| 6 | 1800 | 10 | 10 | $3SrO.Al_2O_3$ (1.4 μm) | 2 | 1 |

| | Impurities in the sintered body |||| Properties of the sintered body |||
|---|---|---|---|---|---|---|---|
| Run No. | Metal derived from component (A) (ppm) | Metal derived from component (B) (ppm) | Other metals (ppm) (*) | Oxygen (wt. %) | Density (g/cm³) | Thermal conductivity (W/m-k) | Light transmittance (%) |
| 1 | Ca 63 | Y 420 | 193 | 0.07 | 3.25 | 241 | 35 |
| 2 | Ca 45 | Y 370 | 216 | 0.05 | 3.26 | 248 | 33 |
| 3 | Ca 90 | Y 450 | 184 | 0.07 | 3.24 | 235 | 40 |
| 4 | Ca 150 | Y 310 | 203 | 0.09 | 3.25 | 219 | 38 |
| 5 | Ba 230 | Y 510 | 214 | 0.08 | 3.26 | 223 | 38 |

TABLE 2-continued

| 6 | Sr | 300 | Y | 490 | 195 | 0.09 | 3.25 | 215 | 38 |

(*): Total amount (as metal) of Mg, Cr, Si, Zn, Fe, Cu, Mn, Ni, Ti and Co.

EXAMPLE 3

In each run, the same AlN powder as used in Example 1 was mixed with each of the alkaline earth metal aluminates indicated in Table 3 as component (A) of a sintering aid and each of the compounds indicated in Table 3 as component (B) of the sintering aid. The mixture was fired by the same procedure as in Example 1 to obtain a pressureless sintered body. The thermal conductivity of the sintered body was measured by the same method as in Example 1.

The firing conditions and the results are shown in Table 3.

EXAMPLE 4

The same AlN powder as used in Example 1 was mixed with alumina powder having an average particle diameter in each of the amounts indicated in Table 4 as component (A-1) of a sintering aid, each of the compounds indicated in Table 4 as component (A-2) of the sintering aid, and each of the compounds as component (B) of the sintering aid. The mixture was fired as in Example 1.

The firing conditions and the results are summarized in Table 4.

In Run No. 7, calcium aluminate obtained by the method of Referential Example 1 was used as component (A) of the sintering aid.

TABLE 3

| | Firing conditions | | | Sintering aid | | | |
|---|---|---|---|---|---|---|---|
| | | | | Component (A) | | Component (B) | |
| Run No. | Temperature (°C.) | Time (hours) | Temperature elevating rate (°C./min.) | Chemical formula (average particle diameter) | Amount (wt. %) | Chemical formula (average particle diameter) | Amount (wt. %) |
| 1 | 1800 | 8 | 7.5 | $3CaO \cdot Al_2O_3$ (1.4 μm) | 2 | $Ce(CO_3)_2$ | 1 |
| 2 | 1800 | 8 | 7.5 | $3BaO \cdot Al_2O_3$ (1.6 μm) | 2 | $La(NO_3)_3$ | 1 |
| 3 | 1800 | 8 | 7.5 | $12CaO \cdot 7Al_2O_3$ (1.5 μm) | 4 | $Y_2(COO)_3$ | 1 |
| 4 | 1800 | 8 | 7.5 | $3SrO \cdot Al_2O_3$ (1.4 μm) | 2 (1.2 μm) | $Y_2O_3$ | 2 |
| 5 | 1800 | 8 | 7.5 | $3CaO \cdot Al_2O_3$ (1.4 μm) | 2 | $Sm_2(CO_3)_3$ | 1 |
| 6 | 1800 | 8 | 7.5 | $3CaO \cdot Al_2O_3$ (1.4 μm) | 2 | $Y(NO_3)_3$ | 1 |

| | Impurities in the sintered body | | | | Properties of the sintered body | | |
|---|---|---|---|---|---|---|---|
| | Metal derived from component (A) | Metal derived from component (B) | Other metals (ppm) (*) | Oxygen (wt. %) | Density (g/cm³) | Thermal conductivity (W/m-k) | Light transmittance (%) |
| Run No. | (ppm) | (ppm) | | | | | |
| 1 | Ca 65 | Ce 240 | 287 | 0.07 | 3.25 | 221 | 31 |
| 2 | Ba 38 | La 410 | 193 | 0.09 | 3.23 | 209 | 30 |
| 3 | Ca 94 | Y 270 | 264 | 0.07 | 3.26 | 243 | 28 |
| 4 | Sr 145 | Y 360 | 251 | 0.06 | 3.26 | 237 | 37 |
| 5 | Ca 43 | Sm 390 | 190 | 0.08 | 3.25 | 215 | 30 |
| 6 | Ca 38 | Y 290 | 323 | 0.06 | 3.26 | 241 | 41 |

(*): Total amount of Mg, Cr, Si, Zn, Fe, Cu, Mn, Ni, Ti and Co.

TABLE 4

| | Firing conditions | | | Sintering aid | | | Component (B) | |
|---|---|---|---|---|---|---|---|---|
| | | | | Component (A-2) | | (A-1) | Chemical formula (average particle diameter) | formula |
| Run No. | Temperature (°C.) | Time (hours) | Temperature elevating rate (°C./min.) | Chemical formula | Amount (wt. %) | Amount (wt. %) | | Amount (wt. %) |
| 1 | 1800 | 9 | 8.5 | CaO | 1.24 | 0.76 | $Y_2O_3$ (1.2 μm) | 1 |
| 2 | 1800 | 9 | 8.5 | BaO | 1.64 | 0.36 | $La_2O_3$ (2.0 μm) | 1 |
| 3 | 1800 | 9 | 8.5 | SrO | 1.51 | 0.49 | $Ce(CO_3)_2$ | 1 |
| 4 | 1800 | 9 | 8.5 | $Ca(NO_3)_2$ | 1.66 | 0.34 | $Y_2O_3$ (1.2 μm) | 1 |
| 5 | 1800 | 9 | 8.5 | CaO | 0.71 | 1.29 | $Y_2O_3$ (1.2 μm) | 2 |
| 6 | 1800 | 9 | 8.5 | CaO | 0.62 | 0.38 | $Sm_2(CO_3)_3$ | 2 |

TABLE 4-continued

| Run No. | | | | | | | | |
|---|---|---|---|---|---|---|---|---|
| 7 | 1800 | 9 | 8.5 | 3CaO.Al$_2$O$_3$ (*1) | 1 | Y$_2$O$_3$ | 2 | |

| | Impurities in the sintered body | | | | | Properties of the sintered body | | |
|---|---|---|---|---|---|---|---|---|
| Run No. | Metal derived from component (A) (ppm) | | Metal derived from component (B) (ppm) | | Other metals (ppm) (*) | Oxygen (wt. %) | Density (g/cm$^3$) | Thermal conductivity (W/m-k) | Light transmittance (%) |
| 1 | Ca | 90 | Y | 250 | 210 | 0.08 | 3.25 | 233 | 39 |
| 2 | Ba | 77 | La | 350 | 223 | 0.05 | 3.26 | 258 | 37 |
| 3 | Sr | 80 | Ce | 425 | 213 | 0.07 | 3.26 | 221 | 31 |
| 4 | Ca | 90 | Y | 338 | 195 | 0.06 | 3.25 | 245 | 37 |
| 5 | Ca | 120 | Y | 570 | 231 | 0.10 | 3.26 | 219 | 30 |
| 6 | Ca | 143 | Sm | 610 | 210 | 0.08 | 3.27 | 220 | 31 |
| 7 | Ca | 188 | Y | 580 | 195 | 0.09 | 3.25 | 210 | 33 |

(*1): Aluminate prepared beforehand.
(*2): Total amount (as metal) of Mg, Cr, Si, Zn, Fe, Cu, Mn, Ni, Ti and Co.

What is claimed is:

1. A process for producing a sintered body of aluminum nitride, which consists essentially of adding to an aluminum nitride powder, based on the total weight of the aluminum nitride powder,
   (A-1) at least 0.34% by weight of an oxide or oxide-forming compound of aluminum,
   (A-2) at least 0.62% by weight of an oxide or oxide-forming compound of an alkaline earth metal, the total amounts of (A-1) and (A-2) being at most 10% by weight, the (A-2)/(A-1) molar ratio being 0.3 to 12, and
   (B) 0.2 to 5% by weight of an oxide or oxide-forming compound of yttrium or an element of the lanthanide series, and firing the resulting mixture to form a sintered body having a good transmittance and a thermal conductivity of 209 to 260 W/m-k.

2. The process of claim 1 wherein the component (A-1) is selected from the group consisting of aluminum oxide, aluminum hydroxide, aluminum nitrate and aluminum acetate.

3. The process of claim 1 wherein the alkaline earth metal in component (A-2) is selected from the group consisting of calcium, strontium and barium.